(12) United States Patent
Ihm

(10) Patent No.: US 6,770,497 B2
(45) Date of Patent: Aug. 3, 2004

(54) FIELD EMISSION EMITTER

(76) Inventor: Jisoon Ihm, 114-406 Olympic Sunsoochon APT, 89 Bangee-dong, Songpa-gu, Seoul (KR)

(*) Notice: Subject to any disclaimer, the term of this patent is extended or adjusted under 35 U.S.C. 154(b) by 0 days.

(21) Appl. No.: 09/949,477

(22) Filed: Sep. 7, 2001

(65) Prior Publication Data

US 2002/0076846 A1 Jun. 20, 2002

(30) Foreign Application Priority Data

Dec. 19, 2000 (KR) .................................. 10-2000-78822

(51) Int. Cl.[7] .............................................. H01L 21/00
(52) U.S. Cl. .......................................... 438/20; 438/99
(58) Field of Search .............................. 438/1, 20, 34, 438/38, 45, 99; 257/40, 60, 66

(56) References Cited

U.S. PATENT DOCUMENTS

| | | | | |
|---|---|---|---|---|
| 6,057,637 A | * | 5/2000 | Zettl et al. ................... | 313/310 |
| 6,097,138 A | * | 8/2000 | Nakamoto ................... | 313/309 |
| 6,283,812 B1 | * | 9/2001 | Jin et al. ........................ | 445/24 |
| 6,383,923 B1 | * | 5/2002 | Brown et al. ............... | 438/666 |
| 6,420,092 B1 | * | 7/2002 | Yang et al. .................. | 430/311 |
| 6,440,761 B1 | * | 8/2002 | Choi ........................... | 313/309 |

OTHER PUBLICATIONS

Wolf et al., "Silicon Processing for the VLSI Era, vol. 1—Process Technology", 1986, Lattice Press, p. 342–344.*

* cited by examiner

*Primary Examiner*—Kevin M. Picardat
(74) *Attorney, Agent, or Firm*—Intellectual Property Law Group LLP; Otto O. Lee; Juneko Jackson

(57) ABSTRACT

The present invention relates to a field emitter array used in various devices including a nanotube-based display and a microwave-amplifying device.

In prior art, an electron accelerated by an electric field collides, for example, with a phosphor on the screen. Light is emitted as a positive ion drops out of the phosphor. Destruction or deformation of the emitter's structure can occur if the positive ion becomes accelerated and collides with the emitter, which results in instability or interruption of the emitter's operation.

According to the present invention, coating a carbon nanotube with a very thin semiconductor or insulating material with a high degree of hardness can protect the carbon nanotube from the external particles (particularly, positive ions). The thin layer also provides for easy electron emission under low voltage, thereby greatly improving the uniformity and stability of electron emission.

4 Claims, 4 Drawing Sheets

FIELD EMISSION EMITTER

BACKGROUND OF THE INVENTION

The present invention relates to a field emitter to be used in various devices including a nanotube-based display and a microwave amplifying device, and, in particular, to a field emitter used in a display device, using a carbon nanotube as the emitter material. Herein, "display device" is intended to cover all of other display devices that use a field emitter.

Since it was first introduced in 1968, the field emission display (FED) has been continuously researched and developed as the next generation of display devices following the CRT (Cathode Ray Tube), TFT-LCD, and a large screen PDP.

In such field emission displays, a field emitter which incorporates the electron gun of a CRT with a material such as a metal (mainly, molybdenum), a semiconductor, or diamond has been considered. Since 1995 when the use of a carbon nanotube as the emitter material was suggested, much research and development associated with the use of the carbon nanotube have been performed.

Using the carbon nanotube as an emitter has many advantages. Because the carbon nanotube emitter is much thinner than a conventional emitter, high electric current can be created with the application of low voltage. Also, increased redundancy resulting from a large number of tips and the unique bonding characteristics of carbon guarantee a higher structural stability than that of a metal emitter.

Suggested carbon nanotube manufacturing approaches include:

First, carbon nanotubes are vertically grown on a substrate covered with a catalyst such as nickel by passing hydrocarbons across the substrate using a chemical vapor deposition (CVD) method;

Second, multiple carbon nanotubes formed using either an arc discharge or a laser ablation method of prior art are then mixed with a metal adhesive agent and arranged on the substrate; and Third, a set of parallel carbon nanotubes formed by applying bias to aluminum is immersed into an acidic solution. The aluminum oxide film is allowed to erode continuously, forming (using a so called anodic alumina method) regularly perforated, fine holes thereon, through which hydrocarbons are passed.

FIG. 1 shows a schematic representation of a conventional, uncoated carbon nanotube. The arrow indicates the direction of electrons (–e) emitted when a voltage is applied, causing the carbon nanotube to act as a cathode. In practice, a large number of nanotube tips are employed, but herein, only one representative nanotube is shown.

Despite the efforts, problems with structural deformation or destruction have not yet been overcome, which results in instability or interruption of the carbon nanotube operation.

An emitter becomes nonfunctional for one primary reason. After an accelerated electron collides with a phosphor molecule, causing the desired emission of light, the positive ion dislodged from the phosphor collides with the emitter itself. For this reason, the level of uniformity, stability and durability of a display screen required for commercial use has been unattainable.

SUMMARY OF THE INVENTION

Accordingly, in view of the previously mentioned problems, the objective of the invention is to provide a carbon-based nanotube field emitter capable of greatly improving the performance of a field emission display. This objective is achieved by coating the tip of the carbon nanotube with a semiconductor or insulating layer with a high degree of hardness, several nanometer (nm) thick. The layer protects the tip from a collision with external particles while permitting electrons to emit freely, thereby establishing the necessary durability and stability of the carbon nanotube as well as reducing the required voltage applied thereto.

In accordance with one embodiment of the present invention, a field emitter comprises a semiconductor or insulating layer deposited thereon by evaporating the semiconductor or insulating layer on the carbon nanotube using an electron beam evaporation method.

In accordance with the other embodiment of the present invention, a field emission emitter comprises a semiconductor or insulating layer deposited on the carbon nanotube by sputtering argon on a semiconductor or insulator to knock out the constituent atoms and inject them onto the carbon nanotubes.

In addition, it is possible to deposit a semiconductor or insulating layer on a carbon nanotube by using all methods used for producing a very thin molecular layer such as a laser ablation method, a conventional CVD method and the like.

DETAILED DESCRIPTION OF THE PREFERRED EMBODIMENT

Figure 2:
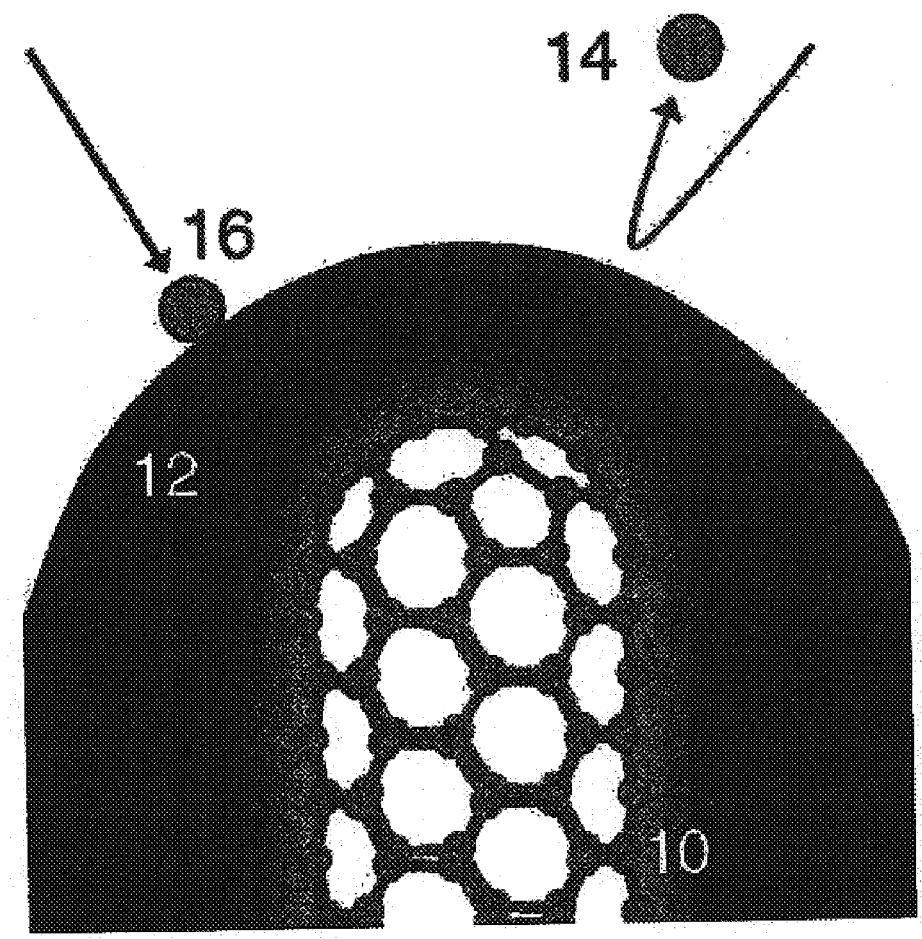
FIG. 2 shows a schematic structure of a field emitter in accordance with the present invention, wherein a carbon nanotube is protected from a collision with external atoms or particles by a thin semiconductor or insulating layer coated thereon.

FIG. 2 is a side view of a field emitter in accordance with a preferred embodiment of the present invention. In practice, there exists a large number of carbon nanotube tips, but only one representative nanotube tip is shown herein. Also, a simple, so called (5,5) nanotube is shown as an example herein, but the same result can be obtained in the case of the nanotube having a different winding shape or size, as well as a single-wall or multi-wall structure.

By using such coating methods as explained above, the carbon nanotube (10) is coated with an n-type doped semiconductor or insulating layer (12) with a high degree of hardness able to withstand collisions with external atoms or particles (usually, positive ions), at a thickness of several nanometers (nm). For the coating purpose, types of B, C, N compounds including BN, GaN, $Si_3N_4$, TiC, $B_4C$, etc., types of oxides including $TiO_2$, $Al_2O_3$, MgO, etc., and parts of ferroelectrics including $SrTiO_3$, etc. can be used. Also, it is possible to use diamond-like carbon (DLC) or diamond particles without performing an n-type doping. The external particles such as atoms or positive ions (14) dropped from the phosphor collide with the semiconductor or insulating layer (12) and either bounce back therefrom or are adsorbed onto the surface thereof.

Figure 1:
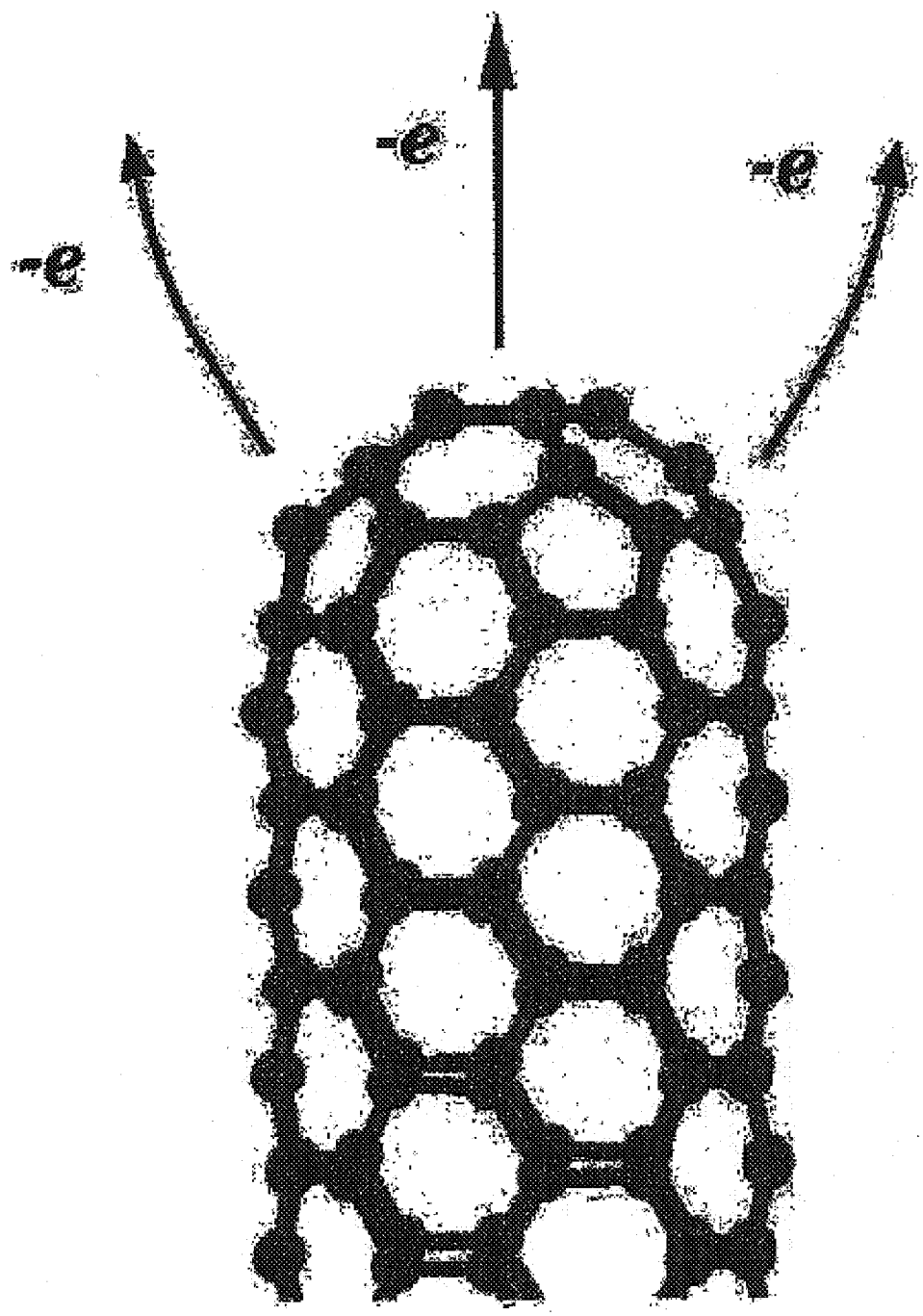
FIG. 1 shows a schematic representation of a conventional carbon nanotube wherein an arrow indicates the direction of electron emission.
Figure 3:
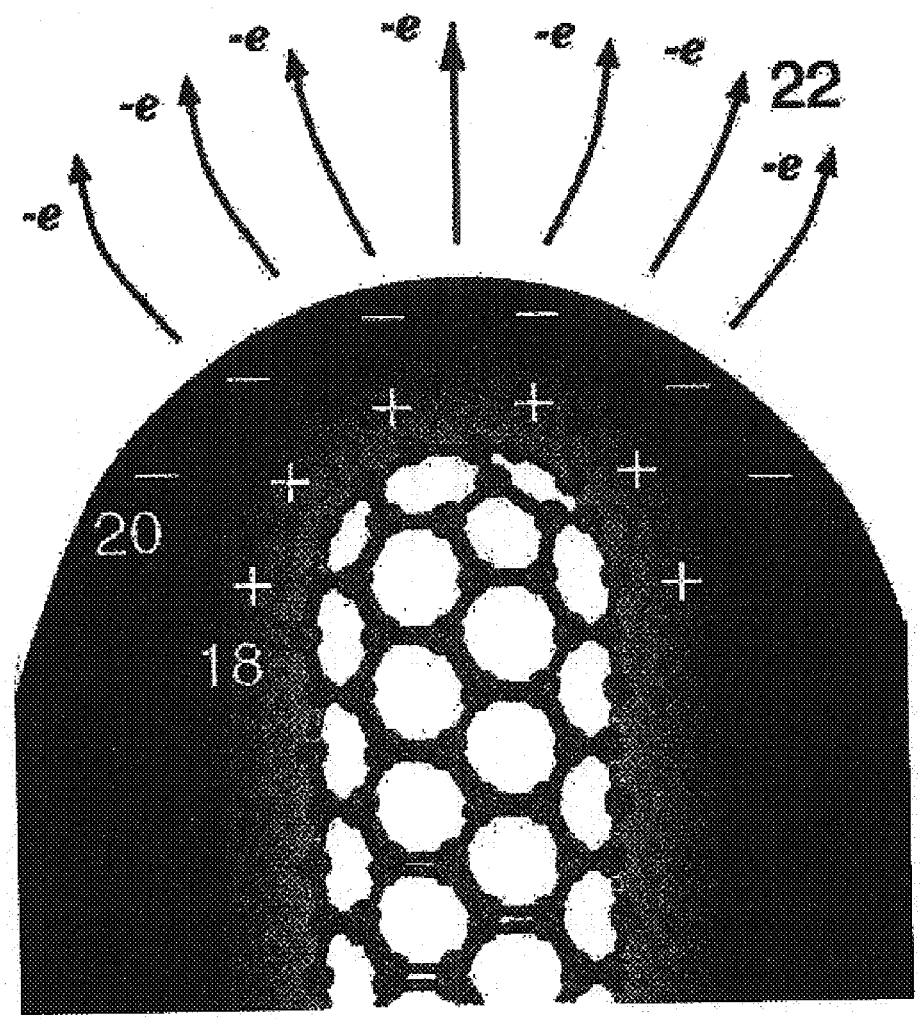
FIG. 3 shows a schematic representation of the amplification of the field emission resulting from the structure of the field emitter in accordance with the present invention.

In addition, if a bias voltage is applied to the carbon nanotube from the outside, a strong electric field is produced on the tip of the carbon nanotube. In this case, a potential distribution within the coated material reduces the potential energy in proportion to the distance from the tip of the carbon nanotube and further reduces the potential barrier. Accordingly, as shown in FIG. 3, a strong electron emission can be induced at a low bias voltage. Since the semiconductor or insulating layer has dielectric properties, if a voltage is applied to the layer, a positive charge (18) is induced around the carbon nanotube and a negative charge (20) is induced on the surface of the semiconductor or insulating layer. Therefore, as indicated by the arrow (22), a large number of electrons are emitted from the semiconductor or insulating layer, as compared with FIG. 1 where the carbon nanotube was not coated. Under n-type doping, enhanced conduction occurring within the semiconductor or insulated layer makes the flow of electrons smooth. Also, electron scattering can be greatly reduced by making the semiconductor or insulating layer as thin as possible.

Figure 4:
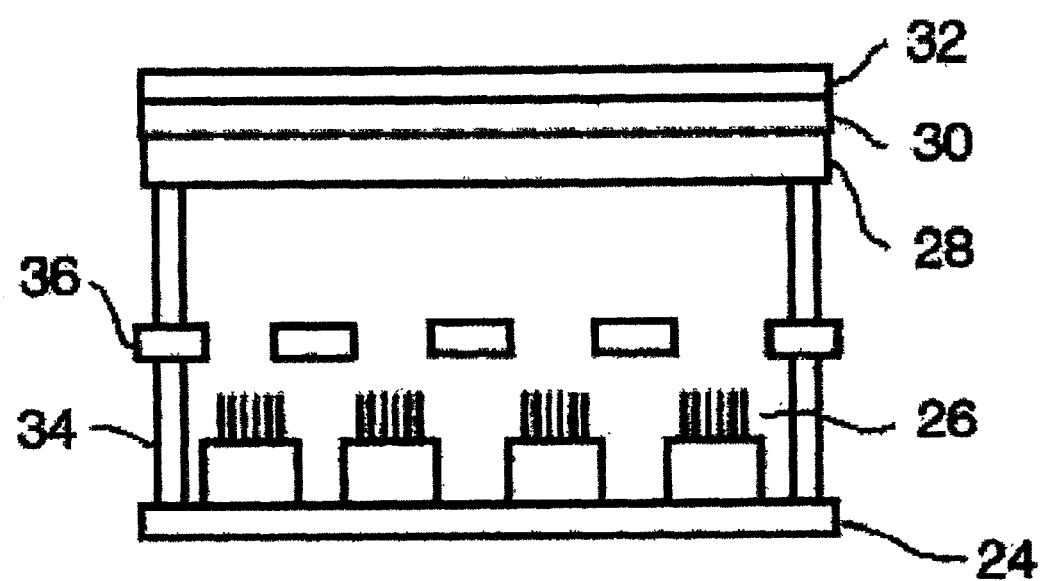
FIG. 4 shows a schematic representation of the use of a field emission tip mounted on a field emission display in accordance with the present invention.

FIG. 4 shows a schematic representation of the use of a field emission tip mounted on a field emission display in accordance with the present invention. Although the inventive field emission tip is constructed on an existing field emission display, the field emission tip is formed by an array of carbon nanotubes thinly coated with a semiconductor or insulating layer, as illustrated in FIG. 2.

As shown in FIG. 4, a pixel is composed of an anode plate (30) coated with phosphor (28), field emission tips composed of carbon nanotubes coated in accordance with the present invention, and spacers (34) to maintain a small vacuum gap between the two. Also shown, is a field emitter array (FEA) panel constructed of two-dimensionally arranged pixels comprising a cold cathode plate (26) installed on a glass substrate (24). A metal grid (36) located between the cold cathode (26) and the anode plate (30) controls the amount of electrons emitted from the cold cathode plate (26) toward the anode plate (30). Horizontal and vertical electrodes are arranged on the cold cathode (26), and the FEA is matrix-addressed through the electrodes. Therefore, when a voltage is applied to the metal grid (36), electrons emitted by the cold cathode are gated by the metal grid (36). Then, the electrons pass through the vacuum gap, strike the phosphor coating on the anode plate, and thereby cause a light emission. Reference 32 indicates a conductive glass (indium tin oxide: ITO) covering the anode plate.

The remarkable feature of the present invention is that the carbon nanotube is protected from collision with the external particles (mainly, molecules or positively charged atoms). As shown schematically in FIG. 2, since the carbon nanotube is protected against collisions by the strong bonding characteristics of the semiconductor or insulating material, electron emissions occur steadily and continuously and thereby greatly improve the brightness and durability of a display device.

As discussed above, coating the tip of the carbon nanotube with a thin semiconductor or insulating layer with n-type doping offers several benefits. A high degree of hardness protects the carbon nanotube from collisions with external particles, while the thinness of the layer greatly increases the emission of electrons under low voltage. Accordingly, the durability and stability of a field emitter consisting of a carbon nanotube developed in accordance with the present invention can be greatly improved, in addition to reducing the voltage required to drive the emitter. Therefore, the invention can be effectively applied to various devices employing a field emission-type display.

Various modifications and alterations of the present invention will become apparent without departing from the scope and spirit of this invention to those skilled in the art, and it should be understood that this invention is not to be unduly limited to illustrative embodiments set forth herein.

What is claimed is:

1. A method of making electron emitting field emitters, the method comprising the steps of:

depositing a semiconductor or an insulating material on a plurality of electron emitting carbon nanotubes by evaporating the semiconductor or insulating material on said plurality of nanotubes using an electron beam evaporation process, wherein all nanotubes are completely coated with the semiconductor or insulating material while permitting electrons to emit freely.

2. The method according to claim 1, wherein said semiconductor or said insulating material is one of materials including kinds of B, C, N compounds selected from the group consisting of BN, diamond-like carbon, diamond, $SiO_2$, MgO, $Al_2O_3$, and $TiO_2$, said one of materials having a high degree of hardness and strong durability against collision of atoms or molecules.

3. A method of making electron emitting field emitters, the method comprising:

depositing a semiconductor or an insulating material on a plurality of electron emitting carbon nanotubes using an argon sputtering process, wherein all nanotubes are completely coated with the semiconductor or insulating material while permitting electrons to emit freely.

4. The method according to claim 3, wherein said semiconductor or said insulating material is one of materials including kinds of B, C, N compounds selected from the group consisting of BN, diamond-like carbon, diamond, $SiO_2$, MgO, $Al_2O_3$, and $TiO_2$, said one of materials having a high degree of hardness and strong durability against collision of atoms or molecules.

* * * * *